United States Patent
Edwards

[15] 3,656,574
[45] Apr. 18, 1972

[54] VEHICLE LOCKING CIRCUIT

[72] Inventor: Joseph Edwards, 8822 Fourth Avenue, North Bergen, N.J. 07047

[22] Filed: July 13, 1970

[21] Appl. No.: 54,153

[52] U.S. Cl. .................................................180/114, 303/89
[51] Int. Cl. .................................................B60r 25/00
[58] Field of Search ..................180/114, 82, 111; 188/265; 303/89

[56] References Cited

UNITED STATES PATENTS

| | | |
|---|---|---|
| 3,559,755 | 2/1971 | Pond.................................303/89 X |
| 1,843,966 | 2/1932 | Adams...............................188/265 X |
| 2,819,770 | 1/1958 | Gibbs.................................180/114 |
| 2,990,903 | 7/1961 | Stingel et al. ........................180/111 |
| 3,549,207 | 12/1970 | Hayes.................................180/111 |

*Primary Examiner*—Kenneth H. Betts
*Attorney*—James and Franklin

[57] ABSTRACT

A circuit is disclosed for locking and unlocking the brakes, ignition and hood of a vehicle so as to secure it from theft. A key-operated master switch is effective in its plurality of positions to: (a) open the ignition-power source circuit; (b) energize a circuit to unlock a normally closed hood lock; (c) energize a circuit which effects the opening and closing of brake locks; and (d) open all electrical circuits of the vehicle. The ignition of the vehicle is connected to the power source via the master switch and is energized only when that switch is in the "ignition on" position. When the master switch is in the brake locking and unlocking position, a secondary switch effects selective actuation of a motor; when the secondary switch is in the "brake lock" position, a half stroke of the motor closes brake locks, and in the "brake unlock" position, the completed stroke of the motor opens the brake locks. The hood lock, being normally closed, is opened when the master switch is in the "hood unlock" position due to the energization of the hood unlock circuit. In the remaining master switch position, the power source is isolated from all electrical circuits of the vehicle, ensuring that the ignition, hood and brakes all remain locked during the absence of the owner or user from the vehicle.

12 Claims, 1 Drawing Figure

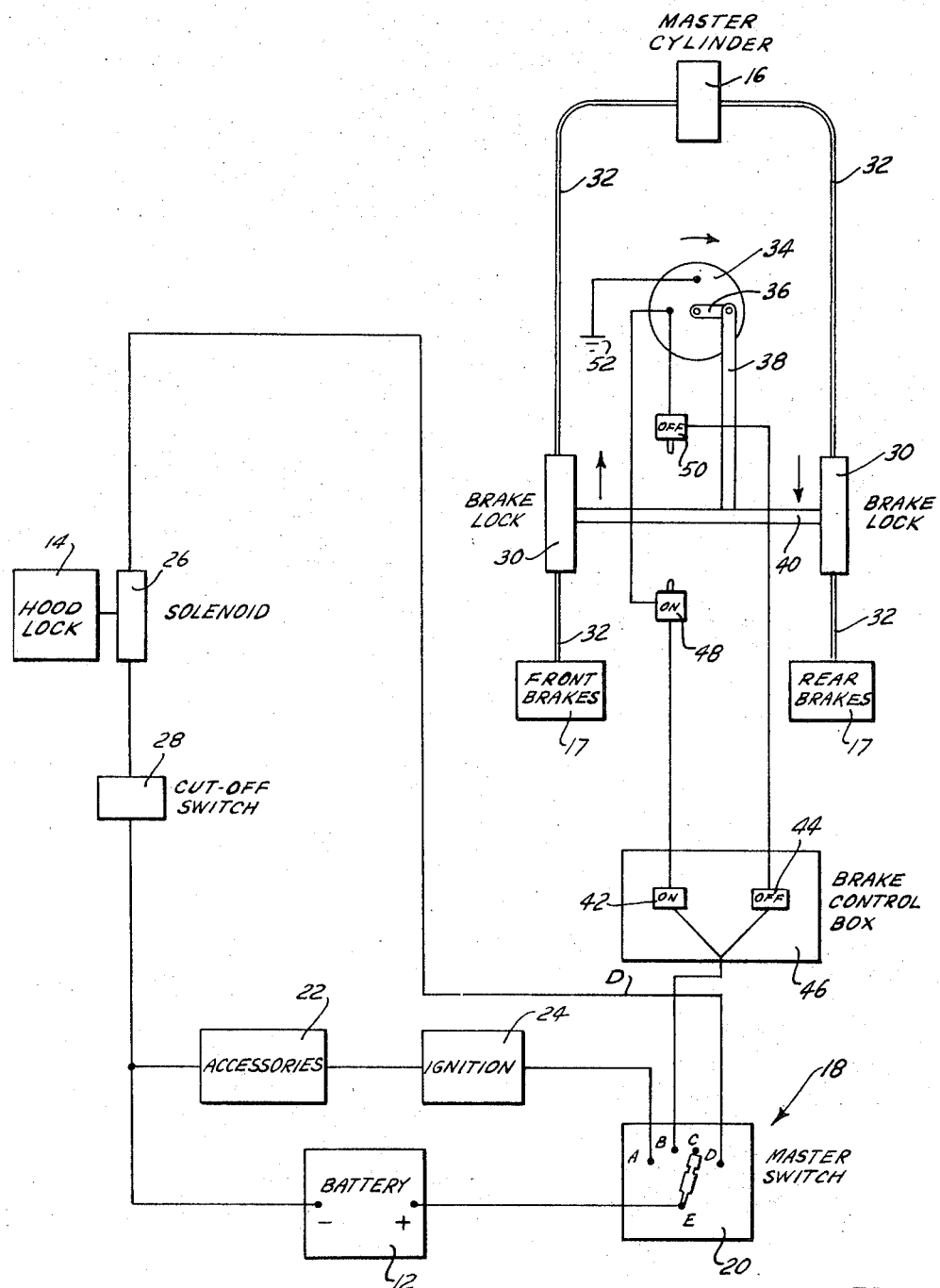

VEHICLE LOCKING CIRCUIT

The present invention relates to a circuit for locking and unlocking the brakes, ignition and hood of a vehicle such as an automobile, bus or truck.

There have been many attempts in the prior art to secure vehicles from theft. Brake locks are by no means new. However, standing alone, they are rather inadequate, since, if a thief can break into the car and gain access to the engine by opening the hood, he can cut the brake lines or disassemble the brake locks, and then "jump" the ignition to start the car and drive away. It is evident that access to the engine area can substantially negate all protection afforded by brake locks. It is further evident that if a would be thief obtains the ignition key by some means, little security from the conventional brake locks can be expected, since in a very short period he could figure out how to lock and unlock the brakes and then drive away. Accordingly, the present invention provides a circuit which can render the ignition, hood and brakes all locked at a given time. The key-operated master switch when switched to its various positions, locks the above mentioned elements, and in one position opens all circuits leading to the power source, thereby ensuring that these elements, once locked, remain locked.

Restricted access to the engine compartment bars tampering with the electrical system, hence making a "jump" of the ignition a very difficult task for even very skilled thieves. Even if the ignition key is somehow obtained from an owner or user, the automobile employing this circuit is still relatively theft-proof, since the ignition key alone is virtually useless. It alone, can neither connect the ignition to the power source so as to start the car, nor open the hood lock nor unlock the brakes. On the other hand, if the master switch key only is obtained, the ignition must still be "jumped" to start the car, thereby rendering the vehicle secure at least from those without sufficient knowledge for this operation. Without either key, even if an auto employing this circuit is broken into, and even if the thief is possessed of sufficient mechanical skills to bypass the ignition, the circuit of the instant invention still renders the vehicle relatively theft-proof.

It is a prime object of the present invention to provide a circuit which locks and unlocks the brakes, ignition and hood of a vehicle, thereby rendering the vehicle substantially theft-proof.

It is another object of the present invention to provide a circuit to lock and unlock the ignition, brakes and hood of the vehicle, which is key-operated by a key other than the ignition key.

It is a further object of the present invention to provide a circuit to lock and unlock the ignition, brakes and hood of the vehicle which is operable at a location conveniently accessible to the driver.

To these ends, a key-operated master switch has a plurality of positions which lock and unlock the ignition, brake locks, and a hood lock of a vehicle, and which has a last position which opens all electrical circuits connected to the power source.

The master switch is in series with the ignition and the battery and unless that switch is in a first or "ignition on" position, there can windshield no current through the ignition.

A second position of the master switch energizes a line having a secondary switch therein. In a first position of the secondary switch, a motor, such as a windshield wiper motor, is moved through a half-stroke closing conventional brake locks. In a second position of the secondary switch, the completed stroke of the motor opens the brake locks. In each position, when the motor is near the end of its half-stroke, the brakes are locked or unlocked and cut-off switches are tripped, thereby breaking the electrical circuit to the motor, such that the brakes can remain in their locked or unlocked condition, as the case may be.

A third position of the master switch energizes a circuit containing a solenoid, causing the normally closed hood lock to open. A cut-off switch then breaks that circuit which remains deenergized until the master switch is again moved to its third position. Upon closing the hood, the hood lock is closed, thus securing the engine compartment.

A fourth position of the master switch opens all circuits to the battery, including the vehicle accessory circuits, thereby permitting the locking devices, once locked, to remain locked, and leaving a "dead" ignition.

To the accomplishment of the above, and to such other objects as may hereinafter appear, the present invention relates to a circuit to lock and unlock the brakes, ignition and hood of a vehicle, as defined in the appended claims, and as defined in the specification, taken together with the accompanying drawing.

In the drawing, a single schematic view of the circuit is shown including the master switch, secondary switch, and ignition, and their respective connections to the battery, brakes and hood lock.

The circuit of the present invention is shown associated with elements such as a battery 12, hood lock 14, master hydraulic cylinder 16, and brakes 17, which are common to ordinary passenger vehicles; however, the circuit can be used with trucks and buses as well. Its application is not restricted to any particular manufacture, model or year vehicle, and the specific placement of the various elements, such as the master cylinder 16, does not limit its usefulness. Further, a vehicle, new off the assembly line, can be equipped with the circuit as original equipment, or those vehicles now on the roads can readily and inexpensively be adapted to employ it.

The master switch 18 is operated by key 20 between four switch positions, A, B, C, and D. As will be shown, the positions A, B and D, all complete sub-circuits, whereas the position C isolates the battery 12 from all electrical elements, including the engine and accessories 22, of the vehicle. The master switch 18 may be conveniently mounted on the dash panel (not shown) of the vehicle within easy reach of the driver, and for reasons of security, its key 20 should be different than that used for the ignition 24. The various electrical lines from the master switch 18, extend into the engine compartment and may be passed through any convenient opening in the fire wall, such as a factory supplied knock-out, or a specially drilled hole.

When the key 20 is switched to position A, the standard electrical circuits to the ignition 24 and engine and accessories 22 are connected to the battery 12. Unless the switch is in position A, there can be no power to either the engine or accessories 12. Actual relative placement of the ignition with respect to the master switch 12 is unimportant as long as they are in series with each other. As previously mentioned, the master switch key 20 should be different from the ignition key, so that a thief who somehow obtains only the ignition key, is unable to start the car as there is no battery 12-ignition 24 connection unless switch 18 is in position A. Similarly, the master switch key 20 alone is incapable of starting the car, so that unless both keys are obtained, a thief would have to "jump" the "dead" ignition 24, and the master switch 12 to start the car.

"Jumping" or bypassing the ignition 24 and master switch 18 is accomplished by making a direct connection between the engine 22 and battery 12. However, such a by-pass necessitates access to the engine compartment, which, in turn, means the hood (not shown) must be opened. For automobiles not provided with hood locks, this is an extremely simple task, since once access to the passenger compartment is obtained, one need merely activate the cable, lever or like device which opens the hood. In fact, many older cars do not even provide this minimal security, and can be opened by merely tripping a lever accessible in the grill area. On the other hand, many new and late model automobiles are provided with individual, key-operated hood locks. While these do provide some measure of protection, a skillful thief might successfully "pick" such a lock. Accordingly, a hood lock 14, of a type known in the art, is included in the circuit 10, which lock holds the hood locked at all times unless the driver deliberately unlocks it. When the hood is closed the hood lock 14 is tripped, thereby locking the hood. Significantly, that hood lock is accessible only from within the engine compartment, and therefore is immune from tampering. From time to time, a driver may wish to open the hood. Therefore, the hood lock 14 is provided with a solenoid 26 which, when energized, unlocks the lock 14. That solenoid 26 is connected to the terminal D on the master switch 18, and its other end is connected through cut-off switch 28 to the negative terminal of battery 12. To open the hood lock 14, the key 20 is switched to position D, thus connecting the positive terminal of battery 12 to the solenoid 26. Current passing through the solenoid 26 activates it, thus opening the hood lock 14. The cut-off switch 28 is included in this subcircuit to break it once the hood lock 14 is opened. This ensures that sub-circuit is not needlessly continuously energized, thus conserving the energy of the battery 12. To secure the hood, it is merely closed in the standard way, and the hood lock 14 is automatically tripped and locked. Thus, it is only necessary to switch key 20 to position D when it is desired to open the hood, but without the key 20, a would be thief is virtually barred from access to the engine compartment and will be unable to perform the by-pass necessary to start the car.

To prevent an unattended car from being towed, conventional brake locks 30 may be provided to lock the front and/or rear brakes 17. The brake locks 30 are placed within the brake lines 32 between the master cylinder 16 and the brakes 17. Specifically, representative brake locks 30 comprise a valve and piston-like member in the brake lines 32; when the brake pedal is depressed, the brake lines 32 become pressurized after which the piston member closes the valve, maintaining the pressure in the brake lines and thus locking the brakes. The brake locks 17 are incorporated into circuit 10 by means of the motor 34 which can be a conventional windshield wiper motor or any adequate substitute therefor. Upon energizing the motor 34 (as hereinafter described), the motor on its first half-stroke, by means of arms 36 and 38, drives arm 40 downwardly. Since the arm 40 is connected to the pistons of the brake locks 17, they are urged by arm 40 to close the valves. Similarly, on the completed half stroke of motor 34, the arm 40 lifts the pistons from the valves, thereby opening the brake lines 32 and unlocking the brakes 17.

Controlled motion of the motor 34 is provided by the combination of the secondary, or brake control switches 42, 44 located on the brake control box 46 (which can be conveniently located on the dash panel), and the limit or cut-off switches 48, 50. Upon moving key 20 to position B on the master switch 18, the line leading to the brake control box 46 is energized. Depression of the "on" push-button 42 permits current to pass through cut-off switch 48 into motor 34, and to ground 52 (and hence to the negative terminal of battery 12). During the passage of current, the arm 40 moves downward until the pistons close the valves so as to maintain the pressure in the brake lines 32. Concurrently, the arm 40 strikes the "on" cut-off switch 48 which opens the circuit to the motor 34, so that arm 40 remains in its lowermost, or brake locking position. Unlocking the brakes 17 is performed by a similar operation; with the key 20 still in position B, depression of the "off" push-button 44 completes a circuit through "off" cut-off switch 50 to motor 34. The motor 34, thus energized, rotates through its completed stroke and raises the arm 40, thereby removing the pistons vrom the valves, and consequently unlocking the brakes 17. Concurrent with the half-stroke of motor 34 the arm 40 strikes the "off" cut-off switch 50 which breaks the circuit to motor 34, so that the arm 40 remains in its highest position, and the brakes 17 remain unlocked.

Position C on master switch 18 completes no circuit at all, in fact, as noted in the drawing, in this position the positive terminal of battery 12 is entirely disconnected from all electrical systems of the vehicle. In this position, the hood lock 14 and brake locks 30, once locked, remain locked, and the ignition 24 is deenergized thus securing the auto from theft.

While the necessary manipulations to unlock the vehicle for use are rather simple, one (such as a thief), not familiar therewith, might be greatly delayed in his misdeed. The correct order of manipulation for the educated user is as follows: (a) switch off the ignition; (b) switch key 20 from position A to position B; (c) pump up the brake pedal to pressurize the brake lines 32; (d) push the "on" button 42, thereby locking the brakes; and (e) switch the key 20 to position C to break all electrical circuits and maintain all locks in locked condition. It should be evident that even if a thief manages to start the car, unless he knows how to unlock the brakes 17 he cannot drive it away. Unlocking the brakes is effected by depressing the "off" button 44 after the key 20 is switched from position C to position B. Then upon switching key 20 to position A, the car may be started and driven away. The "on" and "off" pushbuttons 48 and 50 can be color coded so as to supply as little information as possible to intruders. As noted, the hood lock 14 can be opened at the pressure of the driver by merely switching key 20 to position D.

It is seen that the circuit 10 greatly increases the security of unattended vehicles. A dead ignition, locked brakes and hood, in combination with existing security measures, such as door, steering wheel and gas tank locks, can render the properly equipped vehicle almost immune from the efforts of even the most skillful thief.

While but a single embodiment of the present invention is herein disclosed, it will be evident that many variations may be made in the details thereof, without departing from the spirit and scope of the invention, as defined in the appended claims.

I claim:

1. For use in a vehicle comprising brakes, an engine compartment and a hood enclosing said engine compartment, an anti-theft system comprising a power source, brake locking means operatively connected to said brakes and effective when actuated to lock said brakes, means connected to said brake locking means and effective when energized by said power source to deactuate said brake locking means, thereby to unlock said brakes, hood locking means operatively connected to said hood and effective when actuated to lock said hood, means operatively connected to said hood locking means and effective when energized by said power source to deactuate said hood locking means, thereby to unlock said hood, and master switch means operatively connected to said power source and having a first position energizing said brake lock deactuating means, a second position energizing said hood lock deactuating means, and a third position energizing neither said brake lock deactuating means nor said hood lock deactuating means.

2. The anti-theft system of claim 1, wherein said master switch means is key operated.

3. The anti-theft system of claim 1, wherein said vehicle comprises an ignition means, said master switch means being interposed between said power source and said ignition means.

4. The anti-theft system of claim 3, wherein said master switch means is key operated.

5. The anti-theft system of claim 3, wherein said master switch means has a fourth position which connects said ignition means to said power source.

6. The anti-theft system of claim 5, wherein said master switch means is key operated.

7. The anti-theft system of claim 5, further comprising secondary switch means interposed between said master switch means and said brake lock deactuating means and effective in a first position to connect said brake lock deactuating means to said master switch means and in a second position to disconnect said brake lock deactuating means from said master switch means.

8. The anti-theft system of claim 7, wherein said master switch means is key operated.

9. The anti-theft system of claim 1, further comprising secondary switch means interposed between said master switch means and said brake lock deactuating means and effective in a first position to connect said brake lock deactuating means to said master switch means and in a second position to disconnect said brake lock deactuating means from said master switch means.

10. The anti-theft system of claim 9, wherein said master switch means is key operated.

11. The anti-theft system of claim 1, further comprising cut off switch means operatively connected between said hood lock deactuating means and said power source and effective, in response to the opening of said hood, to de-energize said hood lock deactuating means.

12. The anti-theft system of claim 11, wherein said hood locking means is automatically actuated in response to the closing of said hood.

* * * * *